United States Patent [19]
Jarman et al.

[11] 3,980,002
[45] Sept. 14, 1976

[54] TWO STAGE SOLENOID ACTUATED VALVE, SYSTEM, AND METHOD OF ACTUATION

[75] Inventors: Alonzo B. Jarman, Wrightstown; Kenneth W. Zeuner, Newtown, both of Pa.

[73] Assignee: Control Concepts, Inc., Newtown, Pa.

[22] Filed: May 16, 1975

[21] Appl. No.: 578,006

Related U.S. Application Data
[63] Continuation of Ser. No. 304,816, Nov. 8, 1972, abandoned.

[52] U.S. Cl. .................................. 91/461; 251/44; 251/30
[51] Int. Cl.² ............... F15B 13/043; F16K 31/383
[58] Field of Search .................. 251/44, 43, 45, 30; 91/461

[56] References Cited
UNITED STATES PATENTS

| | | | |
|---|---|---|---|
| 2,310,516 | 2/1943 | Clark | 251/30 X |
| 2,355,164 | 8/1944 | Jaseph | 251/44 X |
| 2,567,892 | 9/1951 | Osterman | 251/30 X |
| 2,664,916 | 1/1954 | Conley | 251/30 X |
| 2,815,921 | 12/1957 | Bigelow | 251/30 X |
| 3,106,936 | 10/1963 | Trautman | 251/44 X |
| 3,282,552 | 11/1966 | Sommese, Sr. | 251/30 X |
| 3,477,466 | 11/1967 | Sturm | 137/599 |

*Primary Examiner*—Arnold Rosenthal
*Attorney, Agent, or Firm*—Allan Ratner

[57] ABSTRACT

A two stage solenoid actuated valve and method of actuation within a predetermined time interval. The valve provides fluid flow having a predetermined flow profile for displacement of a mass through a particular distance with a minimization of shock applied to the mass. The valve has a first and second stage in fluid communication each with the other. The first stage includes a solenoid valve and associated plug member for opening or closing flow through the first stage. The second stage includes a plug member having a predetermined contour head insertable within an orifice whose movement is responsive to the flow state of the first stage.

3 Claims, 5 Drawing Figures

TWO STAGE SOLENOID ACTUATED VALVE, SYSTEM, AND METHOD OF ACTUATION

This is a continuation, division, of application Ser. No. 304,816, filed Nov. 8, 1972 now abandon.

BACKGROUND OF THE INVENTION

A. Field of the Invention

This invention pertains to the field of solenoid actuated valves.

B. Prior Art

Solenoid actuated fluid valves are known in the art. However, some prior devices are of the poppet type where fluid flow passing through the orifice of a valve seat is initiated or terminated almost instantaneously. Such devices provide for quick opening and closing times but produce fluid shock waves during the fluid flow transient stage following the opening and closing operations. When the valve is opened, the total amount of fluid is passed through the valve seat orifice. The fluid acting on a mass or other member downstream of the valve seat causes an abrupt displacement of the mass. This abrupt displacement may cause damage to the mass being displaced.

Such prior devices cause the mass to be instantly accelerated by the moving fluid. This acceleration results in a "jerk" force determined as the time differential of the mass acceleration. Where the "jerk" applied to the mass is not zero, a shock is applied to the mass from the moving fluid which may produce stress or other damage to the mass or components contained therein. Such prior devices do not permit fluid passing through the valve seat orifice to gradually build up over a predetermined time to a full flow characteristic in a manner such that the mass being moved is not subjected to a displacement shock.

SUMMARY OF THE INVENTION

A valve assembly having a first pilot stage with inlet and outlet flow restricting orifices with each orifice having precalculated and nonvariable dimensions and being nonmodulated. A second stage has a second stage orifice between first and second sections. A second stage valve plug has an outer smooth imperforate continuous surface with a substantially parabolic contour to provide a predetermined flow area. A main fluid inlet communicates with the first section and a main fluid outlet communicates with the second section without any balancing device coupled to the second stage valve plug in the main fluid outlet. The first pilot stage is coupled to the second stage valve plug only by fluid communication and in this way to control the time of movement of the second stage valve plug. The predetermined dimensions of the parabolic contour of the second stage valve plug and the second stage orifice and the inlet and outlet flow restricting orifices are chosen in a predetermined relation for providing substantially linear flow rate change when the second stage valve plug moves. In this manner there is provided substantially zero flow jerk.

DESCRIPTION OF THE PREFERRED EMBODIMENTS

Figure 1:
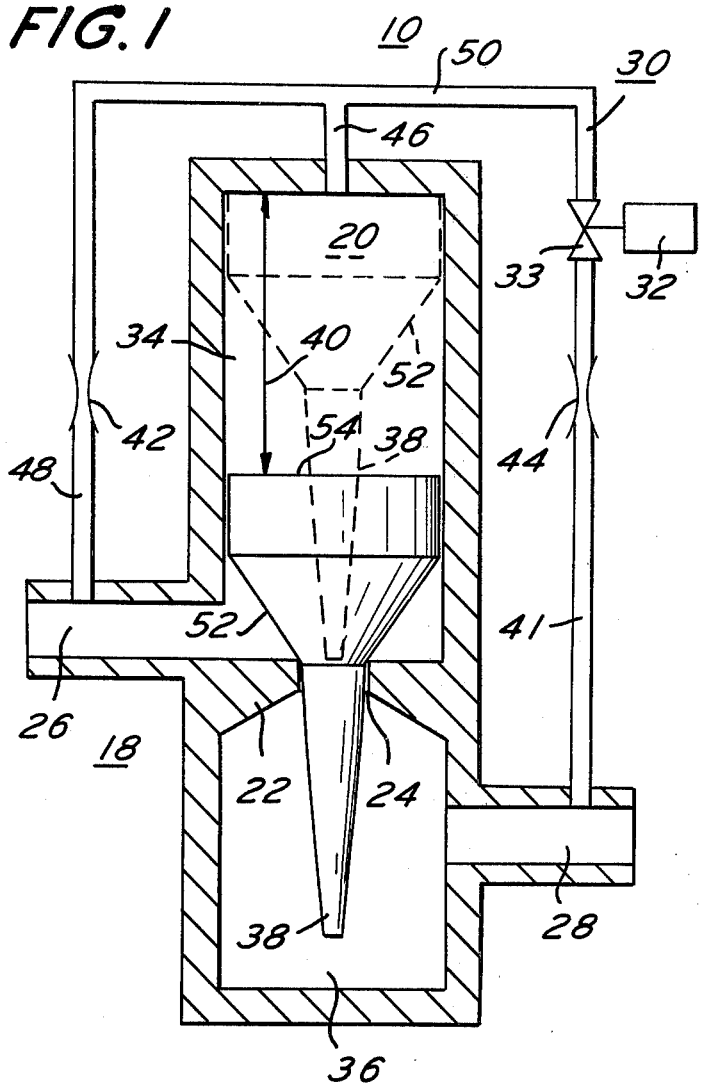
FIG. 1 is a schematic drawing of the two stage solenoid actuated valve showing the second stage plug member in both the closed state and an open state.
Figure 3:
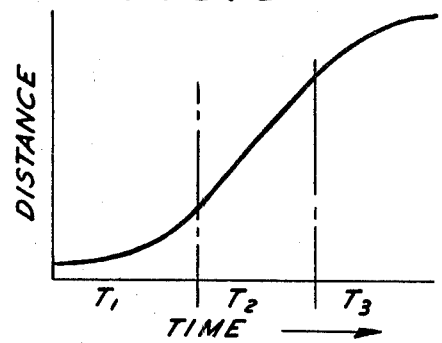
FIG. 3 is a graph of the mass displacement distance versus time as the valve plug passes from a closed state to an open state and back to a closed state.
Figure 4:
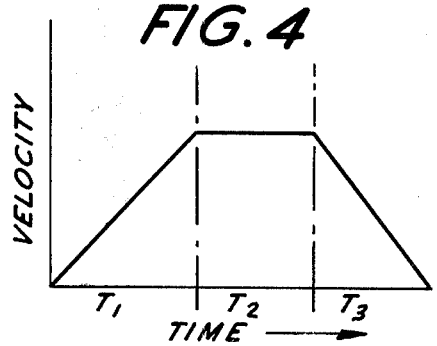
FIG. 4 is a graph of the mass velocity versus time for the time interval of FIG. 3; and, FIG. 5 is a graph of the mass acceleration versus time for the time interval of FIG. 3.
Figure 5:
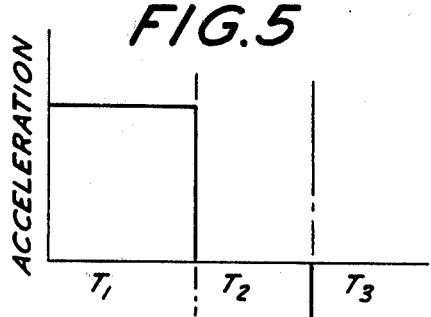
Figure 2:
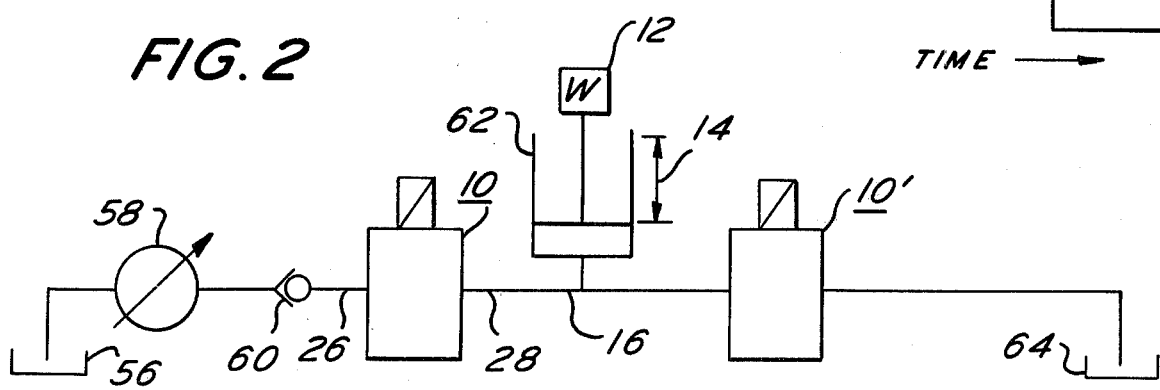
FIG. 2 is a schematic drawing of the valve system showing the mass to be displaced.

Referring now to FIGS. 1 and 2, there is shown two stage solenoid actuated valve 10, and valve 11 for producing liquid flow having a predetermined flow profile. In system 11, the liquid hydraulically moves mass 12 through a predetermined distance 14 with a minimum of shock. Valve 10 is constructed in an manner to achieve mass 12 movement characteristics as shown in FIGS. 3, 4 and 5. Actuation of valve 10 through a series of valve states to be described in the following paragraphs results in a mass acceleration versus time curve as is shown in FIG. 5. This type of acceleration curve provides for a "jerk" approximating zero throughout the time of displacement for mass 12. Jerk is defined here as the third derivative of distance with respect to time or the time rate of change of acceleration.

Therefore, in general, solenoid actuated valve 10 provides a predetermined flow profile of liquid passing through system line 16 to hydraulically move mass 12 throughout movement distance 14 with a minimization of shock being applied to mass 12.

Solenoid actuated valve 10 includes first stage 30 to control the movement of plug member 20 within second stage 18. Second stage plug member or mechanism 20 has a predetermined contour head 38 which is insertable within and linearly moveable with respect to orifice 24 of valve seat 22. Movement of plug mechanism 20 with respect to orifice 24 determines the flow profile of fluid passing from inlet line 26 through valve 10 and finally into outlet line 28. First stage 30 is in fluid communication with plug member 20 of second stage 18 and controls the time of movement of second stage plug 20 with respect to orifice 24 responsive to the energization and de-energization of solenoid mechanism 32 operating on first stage plug member 33.

Second stage 18 of solenoid actuated valve 10 includes second stage upper chamber 34 fluidly connected to inlet line 26, first stage 30 and lower chamber 36. As is seen from the figures, outlet line 28 is in fluid communication with inlet flow line 26 when plug mechanism 20 is not completely blocking fluid flow through orifice 24. Plug mechanism 20 includes a predetermined geometrical contour head configuration to provide a particular flow area between the peripheral wall boundaries of second stage orifice 24 and head contour 38 as plug 20 is linearly moved. Movement of plug 20 from a second stage closed state, shown in darkened lines in FIG. 1, to a second stage open state, shown in phantom lines of the same figure defines stroke length 40 within upper chamber 34.

Initially, when second stage plug member 20 is in a closed state, orifice 24 is completely blocked by plug contour head 34 which is in contiguous contact with valve seat 22. As plug member 20 moves upward in its travel, fluid passing into upper chamber 34, passes through the unblocked portion of orifice 24 into second stage lower chamber 36 and fixably through outlet line 28. The time of movement of second stage plug 20 in passing through stroke 40 in combination with the fluid properties provides the particular outlet fluid profile to achieve the distance, velocity, and acceleration properties of mass 12 shown in FIGS. 3, 4 and 5.

Valve first stage 30 provides the fluid actuation for moving second stage plug mechanism 20 from a second stage open state to a second stage closed state or in reverse order dependent upon the fow profile necessitated as a function of time. First stage 30 includes solenoid mechanism 32 for electromagnetically moving first stage plug member 33 into a closed state for stopping flow into first stage outlet line 41, or into an open state thereby permitting flow from intermediate first stage line 50 into outlet line 41. When first stage plug member 33 is in a closed state, thereby restricting flow into outlet line 41, second stage plug 20 is moveable displaced to a second stage closed state. Opposingly, when member 33 is forced to an open state, thereby allowing flow into and through outlet line 41, second stage plug 20 is displaced to an open state in a predetermined time interval.

Inlet flow restriction member 42 forms a portion of first stage 30 of valve 10. Restriction member 42 is inserted into the fluid flow connecting first stage insertion line 48 and intermediate line 50. Restriction member 42 may be a plug member having an orifice with a predetermined area ($a_1$) or some like mechanism for producing known flow characteristics. Similarly, outlet flow restriction member 44 is inserted between intermediate line 50 and first stage outlet line 41. In general, as is the case for inlet restriction 42, outlet restriction member 44 may simply be a plug member having an orifice with a predetermined area ($a_2$). Each of restriction members 42 and 44, as shown by the derived equations described in following paragraphs, may be used to determine the second stage plug opening and closing time.

Plug actuation line 46 is fluidly connected to first stage intermediate line 50 and upper chamber 34 on opposing ends thereof. In this manner, fluid may be inserted or extracted from upper chamber 34 as a function of the state of first stage plug member 33. Dependent upon the state of plug 33 responsive to the actuation of solenoid 32, it is therefore seen that inlet fluid passing through inlet line 26 is diverted into first stage 30 through insertion line 48, inlet restriction member 42 and first stage intermediate line 50. Fluid may then be diverted into plug actuation line 46 to drive plug 20 into a second stage closed state or the fluid may be driven through outlet line 41 when plug 33 is opened.

Assume now that second stage plug 20 is in a closed state as shown by the darkened line drawing in FIG. 1. In this second stage closed state, solenoid 32 and plug 33 are in an open state thereby permitting flow to pass from intermediate line 50 through first stage outlet line 41. In this state, fluid passing through inlet line 26 bears against plug surface 52 to provide a force on plug 20 in an upward direction (thus beginning to move plug 20 to a second stage open state). Fluid from upper chamber 34 is forced through plug actuation line 46 and into intermediate line 50. The fluid is conducted through open plug 33 and first stage outlet line 41 which fluidly communicates with outlet line 28. As plug 20 moves through stroke 40, fluid passing into second stage 18, is transmitted through orifice 24 responsive to the removal of plug 20 from valve seat 22. Where plug head contour 38 is substantially parabolic, the flow of fluid through outlet 28 provides a profile which leads to a constant acceleration of mass 12 as shown in FIG. 2.

The movement of plug 20 from a second stage closed state to a second stage open state is depicted in FIGS. 3, 4 and 5 as $T_1$.

When plug 20 has reached the top of the stroke, second stage 18 is in an open state. Mass 12 may be continually moved by permitting plug 33 to remain open. In this condition fluid passes through inlet 26, orifice 24, outlet line 28 and hydraulically continues to displace mass 12. Since plug 33 is still open, flow through first stage 30 includes flow through lines 48, 50 and 41 to discharge into outlet line 28. As shown in FIG. 3, this movement is depicted by the abscissa distance $T_2$ and mass 12 displacement is linear with respect to time. Correspondingly, the velocity of mass 12 during this time interval is constant and the acceleration is zero.

At a predetermined time, solenoid valve 32 may be actuated to close plug 33 in intermediate line 50. Flow into first stage 30 through first stage insertion line 48 is directed into plug actuation line 46. This fluid bears against plug upper surface 54 to bring driving second stage plug 20 to a closed state. As plug contour 38 begins to close orifice 24, the fluid flow rate through outlet line 28 decreases. It is to be understood that mass 12 continues in the same directional displacement as shown in the $T_3$ time interval of FIG. 3. However, the velocity of mass 12 linearly decreases within this time interval resulting in a constant deceleration of mass 12 throughout the remaining mass movement distance. Once plug 20 is in a completely closed state with respect to orifice 24, mass 12 has been moved throughout the required mass displacement 14.

Taking the derivative of acceleration with respect to time throughout time intervals $T_1$, $T_2$ and $T_3$ results in a jerk substantially equal to zero. This characteristic leads to a minimization of shock applied to mass 12 throughout displacement 14.

For purposes of clarification, insertion line 48 has been shown to intersect inlet line 26 and draw fluid therefrom. However, it is to be understood, that insertion line 48 may intersect upper chamber 34 directly to draw the inserted fluid into first stage 30. Further, insertion line 48 may not be attached to second stage 18 inlet at all and may accept fluid from a separate high pressure source. Additionally, first stage outlet line 41 is shown hooked into outlet line 28 to form a substantially closed system. However, it is to be understood that in concept, outlet line 41 may be connected to a tank separate and distinct from the fluid flowing through outlet line 28.

The total system 11 concept, of which valve 10 is an integral portion, is schematically shown in FIG. 2. Fluid is drawn from a low pressure tank 56 by high pressure flow device 58 which may be a pump or like mechanism. Fluid then passes through control valve 60 and is inserted into valve 10 through inlet line 26. Upon passage of fluid through valve 10, as has been described, the fluid exits valve 10 through outlet line 28 and into system line 16. The fluid is directed into mass cylinder 62 to drive mass 12 through mass displacement 14. During this unidirectional displacement of mass 12, two stage solenoid actuated valve 10 has completed a cycle from a second stage closed state to an open stage and then returned to a closed state as shown in FIGS. 3, 4 and 5.

Additionally, valve system 11 may include a second solenoid valve $10^1$ as is shown. Valve $10^1$ is inserted into system 11 in order to lower mass 12 with the same minimization of shock that was achieved in lifting mass 12 through displacement 14. During actuation of valve 10, second solenoid valve 10¹ is maintained in a second stage closed state. Therefore, no flow is permitted through valve 10¹ into tank 64. When mass 12 is to be lowered, valve 10¹ is actuated through a cycle state substantially the same as that cycle state valve 10 has gone through.

Assuming plug mechanism 20 is in a closed state as shown by the darkened lines in FIG. 1, a description of the fluid mechanics equations will more clearly show the motion of mass 12 as a function of the actuation of valve 10. It is now to be understood that the movement of mass 12 through mass movement distance 14 will consist of (1) driving plug mechanism 20 from a second stage closed state to an open state; (2) permitting mechanism 20 to remain in a second stage open state for a predetermined length of time; and, (3) driving plug mechanism 20 from the open state to the closed state. The movement of mass 12 through unidirectional distance 14 is shown in FIG. 3.

In the initial state, mass 12 is at rest and is not being moved. In this state, plug mechanism 20 is closed and no flow is passing from inlet line 26 to outlet line 28. Solenoid valve 32 is assumed to be normally closed for purposes of this description (however, may easily be made normally open) and maintains plug 33 in a closed or flow-restricting position. Flow passes through inlet line 26, insertion line 48, plug actuation conduit 46 and into upper chamber 34 to apply a force on valve plug upper surface 54 to maintain mechanism 20 in a closed state. In this initial state, solenoid valve 32 and first stage plug 33 is closed and no flow passes through restriction 44.

At the beginning of the opening state, a signal is sent to solenoid valve 32 to cause an opening through retraction of plug 33 from the fluid flow path. Flow then is initiated through outlet flow restriction 44 as well as from upper chamber 34 through plug actuation line 46. Contoured plug 20 moves up from valve seat 22 and fluid passes through orifice 24 between plug contour 38 and the orifice walls. Fluid flows into lower chamber 36, outlet line 28, mass line inlet 16 and displaces mass 12. The opening time for mechanism 20 passing through stroke 40 may be written:

$$T_o = \frac{V_{uc}}{Q_2 - Q_1} \qquad (1)$$

where:
$T_o$ = Opening time (seconds)
$V_{uc}$ = Volume of upper chamber 34 (in³)
$Q_2$ = Flow rate through outlet flow restriction member 44 (in³/Sec.)
$Q_1$ = Flow rate through inlet flow restriction member 42 (in³/Sec.)

As is clearly seen from equation 1, the total opening time is the volume of upper chamber 34 divided by the net flow out of chamber 34. The values for each of flow rates $Q_2$ and $Q_1$ may be written as a function of pressure differences, as follows:

$$Q_1 = k_1 a_1 \sqrt{P_1 - P_2}$$

$$Q_2 = k_1 a_2 \sqrt{P_2 - P_3} \qquad 2$$

where:

$k_1$ = orifice constant empirically derived (Typically 100 for 5606 hydraulic oil at 100° F.)
$a_1$ = inlet restriction member 42 area (in²)
$P_1$ = pressure of fluid through inlet line 26 (Lb/in²)
$P_2$ = pressure of fluid within upper chamber 34 (Lb/in²)
$P_3$ = pressure of fluid in outlet line 28 (Lb/in²)

In general the pressure in outlet line 28 ($P_3$) is lower than pressures $P_1$ and $P_2$ and is nominally considered as a reference level. For simplicity in these calculations, the reference level will be considered as zero. Since, during the opening state where plug mechanism 20 is sweeping through stroke 40, a force balance above and below mechanisms 20 must exist, it is seen:

$$P_1 (A_p - A_o) = P_2 A_p \qquad 3.$$

where:
$A_p$ = area of plug upper surface 54 (in²)
$A_o$ = area of orifice 24 (in²) Defining an area ratio as:

$$A_R = \frac{A_p - A_o}{A_p} \qquad (4)$$

and inserting into equation (3), it follows that upper chamber 34 pressure may be written:

$$P_2 = A_R P_1 \qquad 5.$$

Inserting equations (2) into equation (1) and further assuming that tank pressure $P_3$ is substantially negligible, the opening time may be written:

$$T_o = \frac{V_{uc}}{(k_1 a_2 \sqrt{P_2}) - (k_1 a_1 \sqrt{P_1 - P_2})} \qquad (6)$$

combining equation (6) with equation (5) yields:

$$T_o = \frac{V_{uc}}{k_1 a_2 \sqrt{A_R P_1} - k_1 a_1 \sqrt{P_1 - A_R P_1}} \qquad (7)$$

It is therefore seen, that for a given inlet pressure condition ($P_1$) a wide variety of opening times may be achieved by selecting appropriate orifice areas ($a_1$ and $a_2$) for flow restriction members 42, 44.

Once plug mechanism 20 has opened fully, a full second stage open state has been achieved. Where plug mechanism 20 and solenoid valve 32 remain open, constant flow through outlet line 28 will displace mass 12 at a constant velocity with substantially zero acceleration effects.

In order to bring mass 12 to a maximum displacement with minimum shock, solenoid valve 32 is closed at a predetermined time. Plug mechanism 20 is forced to a closed position as flow through restriction member 44 is terminated. Assuming plug mechanism 20 is in a fully opened position, then the closing time may be written in the following manner:

$$T_c = \frac{V_{uc}}{Q_1} \qquad (8)$$

where:

$T_c$ = closing time (sec.)

The closing time is simply the upper chamber volume divided by the flow rate through flow restriction member 42. Combining equation (8) with equations (2) and (4) it is seen that:

$$T_c = \frac{V_{uc}}{k_1 a_1 \sqrt{P_1 - A_R P_1}} \quad (9)$$

Therefore; given a particular inlet pressure condition, a multiplicity of closing times may be obtained by selecting the proper value of restriction area ($a_1$).

In order to achieve a minimum shock curve for mass 12, contour 38 of plug mechanism 20 has been constructed in substantially parabolic contour. Such contours are formed empirically and are useful for particular opening times. Parabolic contours have been used for opening and closing times in excess of 0.5 seconds. This long stroke times have been achieved when stroke 40 has been made longer than 0.25 times the diameter of orifice 24. Other low shock solenoid actuated valves 10 have been constructed with opening times between 25 and 50 miliseconds. Such quick stroke times have been provided by substantially blunt-nosed contours 38.

The various states through which value 10 passes is shown in the following table:

Where second stage plug 20 is in a closed state, solenoid valve 32 actuates plug 33 to open a fluid flow channel through first stage outlet line 41. Plug member 20 having head contour 38 is then withdrawn from contiguous contact with orifice 24 responsive to the actuation of solenoid valve 32.

The step of withdrawing plug 20 from contiguous contact with orifice 24 includes the step of moving plug member 20 through stroke length 40 within a predetermined time interval. As has been described, when contour 38 is substantially parabolic, the stroke time interval may be controlled to a time in excess of 0.5 seconds. Where a blunt shape head contour 38 is used, stroke times within the range between 30.0 and 50.0 miliseconds has been achieved.

As plug 20 is withdrawn, the volume of upper chamber 34 is decreased and fluid contained therein is forced through plug actuation line 46 into intermediate line 50 and through first stage outlet line 41. After plug 20 has been displaced through stroke length 40, solenoid 32 may be de-energized or deactuated to interrupt the flow of fluid into outlet line 41.

Fluid is then inserted into upper chamber 34 through line 46 to contact upper surface 54 of plug 20. Insertion of fluid into chamber 34, then forces plug 20 to be reinserted into orifice 24 thereby forcing plug 20 to a

VALVE STATE TABLE

|  | OPEN | CLOSED | ENERGIZED | DE-ENERGIZED |
|---|---|---|---|---|
| INITIAL STATE |  |  |  |  |
| Plug Mechanism (20) |  | X |  |  |
| Solenoid Valve (32) |  |  |  | X |
| Plug (33) |  | X |  |  |
| *Restriction Member (44) |  | X |  |  |
| *Restriction Member (42) | X |  |  |  |
| OPENING STATE ($T_1$) |  |  |  |  |
| Plug Mechanism (20) | X** |  |  |  |
| Solenoid Valve (32) |  |  | X |  |
| Plug (33) | X |  |  |  |
| *Restriction Member (44) | X |  |  |  |
| *Restriction Member (42) | X |  |  |  |
| FULL OPEN STATE ($T_2$) |  |  |  |  |
| Plug Mechanism (20) | X |  |  |  |
| Solenoid Valve (32) |  |  | X |  |
| Plug (33) | X |  |  |  |
| *Restriction Member (44) | X |  |  |  |
| *Restriction Member (42) | X |  |  |  |
| CLOSING STATE ($T_3$) |  |  |  |  |
| Plug Mechanism (20) |  | X** |  |  |
| Solenoid Valve (32) |  |  |  | X |
| Plug (33) |  | X |  |  |
| *Restriction Member (44) |  | X |  |  |
| *Restriction Member (42) | X |  |  |  |

* Closed; no flow: Open; flow
**Transient opening and closing

The method of displacing mass 12 may be described as follows. Mass 12 is in fluid communication with outlet line 28 of solenoid actuated valve 10 having first stage 30 and second stage 18 corresponds to the reversible movement of plug 20 from an open to a closed state. Initially, high pressure fluid is inserted into first stage 30 through insertion line 48, and into second stage 18 through inlet line 26. As is seen in FIG. 1, inlet line 26 is tapped to provide the necessary fluid flow into first stage 30.

closed state. As has been previously detailed, the movement of plug 20 through stroke 40 in a predetermined time in combination with head contour 38 produces fluid flow through outlet line 28 having a particular flow profile.

What is claimed is:
1. A valve assembly comprising
a first pilot stage adapted to have its inlet coupled to a fluid source and its outlet connected to a fluid outlet, said first pilot stage having an inlet flow restricting orifice and an outlet flow restricting orifice with each flow restricting orifice having precalculated and nonvariable dimensions and being nonmodulated, solenoid valve means coupled between said orifices, a second stage divided into first and second sections, a second stage orifice between said first and second sections within which a single movable second stage valve plug reciprocates without mechanical bias, said second stage valve plug having an outer smooth imperforate continuous surface with a substantially parabolic contour to provide a predetermined flow area between said second stage orifice and said parabolic contour as said second stage valve plug moves through said second stage orifice between an open state and a closed state, a main fluid inlet communicating with said first section and a main fluid outlet communicating with said second section without any balancing device coupled to said second stage valve plug in said main fluid outlet, said first pilot stage being coupled to said second stage valve plug and said first section not by mechanical connection except for fluid communication for controlling the time of movement of said second stage valve plug from one of the states to the other, and the predetermined dimensions of (1) said parabolic contour of said second stage valve plug (2) said second stage orifice and (3) said inlet and outlet flow restricting orifices being chosen in a predetermined relation for providing substantially linear flow rate change when said second stage valve plug moves thereby to provide substantially zero flow jerk.

2. The valve assembly of claim 1 in which the stroke length of said second stage valve plug is longer than 0.25 times said second stage orifice diameter for achieving a stroke time in excess of 0.5 seconds.

3. The valve assembly of claim 2 in which there is provided mass displacement means coupled to said main fluid outlet for moving a mass to a predetermined distance with said substantially zero flow jerk.

* * * * *